March 9, 1943.   H. P. PHILLIPS   2,313,395
PISTON RING
Filed Aug. 4, 1941

INVENTOR.
Harold P. Phillips
BY Earl D Chappell
ATTORNEYS.

Patented Mar. 9, 1943

2,313,395

UNITED STATES PATENT OFFICE 2,313,395

PISTON RING

Harold P. Phillips, Hastings, Mich., assignor to Hastings Manufacturing Company, Hastings, Mich., a corporation of Michigan Application August 4, 1941, Serial No. 405,297

4 Claims. (Cl. 309—44)

This invention relates to improvements in piston rings.

The main objects of this invention are:

First, to provide an improved composite piston ring assembly having the property of coating the cylinder wall with a film of anti-scuffing metal and which at the same time is not subject to certain objections which have been found to characterize hitherto known constructions designed for a similar purpose.

Second, to provide a piston ring assembly of the foregoing type which is highly effective in depositing an anti-scuff coating and which at the same time has an improved blow-by control characteristic, the latter being maintained throughout the life of the ring.

Third, to provide a piston ring installation having high unit cylinder wall pressure during the wearing in period and for depositing a film of lubricating metal on the cylinder wall during this period, and for thereafter exerting an effective sealing engagement on the cylinder wall during the remainder of the period of operation of the installation so as to be characterized by a great improvement in the blow-by control of the installation.

Further objects relating to details and economies of my invention will appear from the description to follow. The invention is defined in the claims.

A structure embodying the features of my invention is illustrated in the accompanying drawing, wherein.

Figures 1, 2:
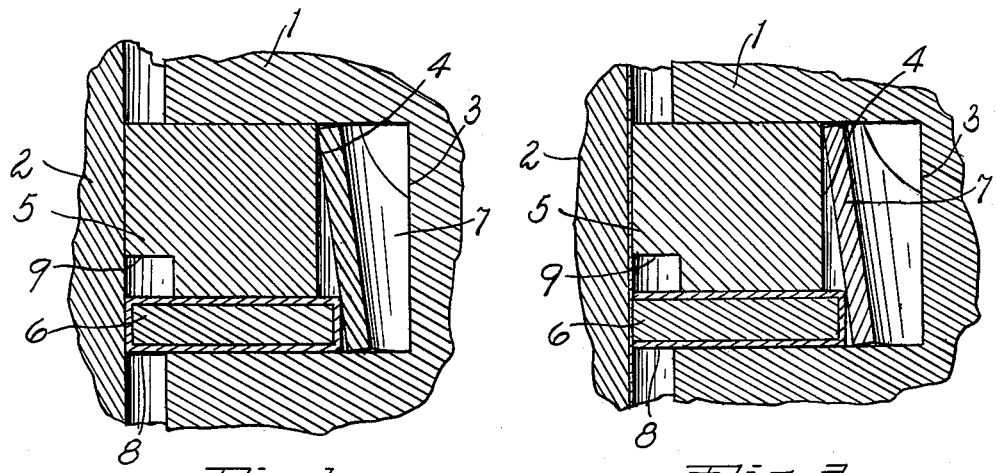
Fig. 1 is an enlarged fragmentary view in vertical section illustrating a ring assembly in accordance with my invention in operative relation to a piston and cylinder, no attempt having been made to represent exact dimensions or dimensional relations of the parts, either in this figure or the other figures, or to illustrate the working clearances.
Fig. 2 is a view similar to Fig. 1 illustrating the parts following predetermined initial wearing in of the assembly.
Figure 3:
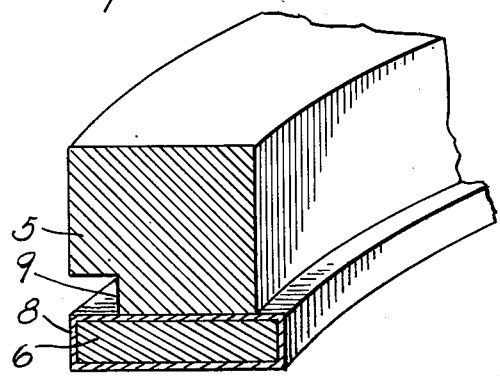
Fig. 3 is a perspective view illustrating two of the coacting ring elements in the functional relationship thereof at the time of installation.

This invention relates in general to a piston ring assembly of the type which is designed to deposit a thin coating or film of a relatively soft lubricating metal on the cylinder wall during the operation thereof, so as to fill minute cavities or irregularities in the coacting piston and cylinder surfaces and to prevent scuffing of the ring surfaces along the cylinder. I have found that certain self-lubricating metals heretofore employed for this general purpose, under certain bore conditions and in some engines or in some fuel or lubricating oil or weather conditions or a combination thereof, are subject to an acid attack or corrosion, electrolytic or otherwise. This may result because of a potential difference existing between the various materials of the piston, piston ring elements and/or cylinder wall, or it may be due to the presence of certain acids formed from combustion or from imperfect combustion as occurs in winter operations. However, the fact is that in some conditions or combination of conditions deterioration occurs with certain metals, for example, bronze and to some extent brass, resulting in rapid corrosion removal of metal from the coating element. The present invention is mainly concerned with the elimination of this objection or the solving of this problem. However it has other likewise important purposes, to-wit, the production of a metal coating element of the type described which, following initial operation, is resistant to wear and slidably engages or coacts the wall surface having the metal deposited thereon with a minimum of cylinder wall friction; which engages the cylinder wall with high unit tension so as to materially reduce blow-by, and which by reason of the particular fabrication of the initial coating element of the assembly maintains this blow-by control throughout a long life.

Further aspects of the invention will appear as the description proceeds.

Referring to the drawing the reference numeral 1 designates a piston of an internal combustion engine which reciprocates in a cylinder 2 and is provided with an annular groove 3 receiving the piston ring assembly of my invention. For reasons which will hereinafter clearly appear, it is highly important that this groove be a groove other than the topmost or first groove of the piston.

The assembly disposed in groove 3 is designated generally by the reference numeral 4 and consists of an annular, split, cast-iron ring member 5, which, as illustrated, is of generally rectangular section; a thin, split, annular ribbon-like element 6 disposed beneath member 5 in the groove (for reasons which will hereinafter appear) and of greater radial dimensions than member 5 so as to extend radially inwardly thereof; and an inner split, crimped, expanding spring 7 which is of thin, ribbon steel disposed at the bottom of the groove for radial expanding engagement with the assembly.

While the expander 7 is designed mainly to act on the element 6, there is a tendency for it to cant and stabilize as shown in Figs. 1 and 2. In this position it exerts some thrust on element 5. This, however, is incidental, as the main purpose is to provide high unit pressure on element 6.

Element 6 consists of a thin, flat, ribbon-like, split annulus of untempered and comparatively soft steel, though of high carbon content. The steels which have been employed in practical embodiments of the present invention had from .3% to .5% carbon content, and preferably I prefer to employ a carbon content of at least .5% for reasons to appear. The element 6 is coated on all of the surfaces thereof with a substantial coating 8 of tin, which metal I find to be not characterized by the corrosive action under operative conditions described above. The tin coated element 6 in a desirable installation is of approximately .003 inch greater radial thickness than the cast iron member 5, plus or minus as much as .002 inch, from which it will appear that greater radial pressure or thrust is exerted by the inner expanding spring 7 on element 6 than on the member 5, although, as stated, expander 7 in use cants over into stabilizing engagement with the member 5. It should also be borne in mind that a steel of the aforesaid carbon content may have inherent spring action of itself. While the tin coating or plating seems to answer every purpose, some other noncorrodible lubricating metal coating might be used with at least some of the desirable result attained.

With reference to the dimensions of the component parts of the ring construction described above, for a ring assembly having a total axial dimension of ⅛ inch, the corresponding dimension of the steel element 6 is approximately .030 inch. Thus, in an actual construction having a total axial dimension of .1235 inch, the axial width of the cast iron member 5 is approximately .0935 inch and that of the steel element 6 is .030 inch. The thickness of the tin plate on steel member 6 varies from .0001 to .0005 inch on a side, hence the axial width of steel member 6 may be increased by a total of .001 inch of tin, half on either side thereof, or to a total axial width of .031 inch. Of course, the radial thickness of the steel element 6 is increased correspondingly by the tin plate. I desire it to be understood that the invention is not to be construed as unduly limited to any particular thickness for the tin plated coating. It is desired to employ a plating of considerable thickness, inasmuch as the tin on the steel section is to be used not only to protect the ring element itself against seizure, but also to coat the cylinder wall and to lubricate the faces of the other ring or rings in the assembly. Moreover, as hereinafter pointed out, such coating continues throughout the life of the ring assembly, even when the coating on the outermost periphery of element 6 has been worn away.

On rings of less total axial dimension that ⅛ inch or .125, a lesser dimension for the steel section is employed. For example, for a 3/32 overall dimension, I employ a steel element of .020 inch axial dimension, the cast iron member 5 being .072 inch.

It should be understood with reference to the foregoing dimensions, that certain variables are introduced in providing ring groove clearances. Most piston ring grooves are of nominal dimensions, the ⅛ inch groove being .125 inch in height and the ring having from .001 to .002 groove clearance. In a multiple-piece ring, such as that under consideration, it is advisable to have somewhat more groove clearance than is found in a single-piece ring, due to variations in manufacturing tolerance of the plural parts. Furthermore, the type of piston involved affects the amount of clearance to be provided. For instance, a Diesel ring usually has more groove clearance than a ring for a spark plug ignition engine. Accordingly the dimensions given above are approximate to a certain extent, the figures given, however, indicating with comparative exactness the relation in size of the respective parts.

The reference numeral 9 designates an annular oil collector or scraper recess in the lower, outside edge of the cast-iron member 5. This recess has the important function of producing a better seal and better lubrication, likewise acting as a factor in preventing scuffing because of the reduction of the face area of the ring member, and the ring assembly as a whole which it represents.

Figure 4:
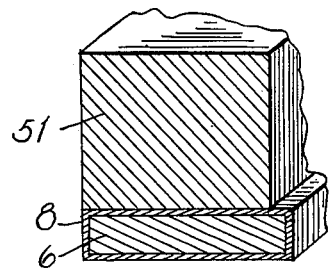
Fig. 4 is a fragmentary, perspective view illustrating the invention as embodied in a slightly modified ring assembly.

In Fig. 4 I illustrate a somewhat modified embodiment of the assembly in which the scraper groove is omitted from the lower outer corner of the cast-iron ring member 51, the latter having full sealing engagement with the cylinder wall on its outer periphery.

At the commencement of operation the tin-coated or plated element 6 is urged strongly in a radial direction against the cylinder wall so that it quickly deposits a film of tin on the surface of the cylinder wall as well as on the surface of the cast-iron member 5, and as the operation proceeds during the subsequent life of the assembly further application of tin from the side surfaces of the plated element, which are exposed at the outer periphery of the latter, takes place. Of course, when the outermost peripheral film of tin on element 6 wears down, engagement of the relatively hard steel element or section 6 with the cylinder wall takes place, this engagement being under the substantial radial thrust of the element due to its inherent springiness plus part of the force of the expanding spring 7. However, the coating of the cylinder wall continues even when the outer peripheral layer of tin has been worn away, the tin for this continuing coating operation being removed from the top and bottom coated surfaces of the element. Though I have made no attempt to show with exactness the relative dimensions in the drawing, the steel segment will become worn away so that during the latter life or use of the assembly the expander will coact with the member 5, thereafter exerting equal expansive effort on this member as well as the steel member. However, it will be appreciated that the unit wall pressure of the steel element is greater because of its thinner character.

I find that in actual operation an assembly of the above described character has great advantages. The sliding friction thereof on the cylinder wall is greatly reduced by the tin plating applied to the latter and scuffing is eliminated both initially and following sufficient wear to bring the steel body of the element 6 into engagement with the cylinder wall.

I desire to emphasize the desirability of the concept of mounting the assembly of my invention below the top ring groove of the piston and, as a corollary thereof, the desirability of disposing the plated steel element below the cast-iron member when the assembly is mounted in the second, or even the third ring groove. Thus, if a special plated element, fabricated of steel coated with tin in the manner described, is disposed in the first or topmost ring of the piston, it manifestly comes in contact with an abrasive which enters the combustion chamber with the fuel vapor. Even carbon formations existing in the upper ring groove can be considered such an abrasive. Being in contact with such abrasives simply means that the coating of soft tin on the special plate element produces a binder for this abrasive so that a very effective lapping operation takes place when the ring is in operation. The ring lands of the piston are subject to wear, and even the cylinder wall wear may be substantially aggravated because of the lap generated by the abrasive particles embedded in the soft metal coating. It is therefore of importance that the ring structure of my invention be used below the upper ring groove. For the same reasons it is highly desirable in most installations that it be placed below the member 5 rather than above the same, thus being positioned it is as far as possible away from the abrasive material while getting the same results of minimization of friction, improvement in blow-by control and increased operative life, resistance to corrosion and absence of objectionable wearing referred to above.

From the foregoing it will appear that I have devised an assembly including an element capable of coating the cylinder wall with a metallic lubricant, thereby greatly decreasing the friction of subsequent operations and preventing scuffing, and in addition, which is of substantial importance, greatly increasing the effectiveness of the blow-by control. This is by reason equally of the resilient character of the steel employed as a base for this element and its thin, ribbon-like nature. In these respects I belive that I have departed substantially from all prior art structures of which I am aware. Heretofore known soft metal, cylinder will coating elements have never been characterized by any capability of improving blow-by control to my knowledge. A lengthened effective life of the assembly as a whole is a further advantageous characteristic of my structure.

Embodiments of the invention which incorporate the principles of the invention in a highly desirable manner have been illustrated and described. It should be understood that the foregoing terminology is used only descriptively rather than in a limiting sense, and with full intention to include equivalents of the features shown and described, with the scope of the following claims.

Having thus described my invention, what I claim as new and desire to secure by Letters Patent is:

1. The combination with a piston having a plurality of piston ring grooves in axially spaced relation therein, a piston ring assembly disposed in one of said grooves beneath the top groove and comprising a split expansible cast iron member, a lower thin split expansible member of ribbon steel having a radial width substantially exceeding that of the upper member, and an expander acting on said ring members, said lower member having a coating of tin on its sides and the external periphery thereof, such coating on the sides of said member being of the order of .0001 to .0005 thereby providing a supply of tin which is gradually advanced to contact the cylinder wall as the lower ring member is worn following the wearing away of the coating on the outer peripheral surface thereof, said upper member being without a coating.

2. A piston ring assembly adapted for use in a piston ring groove other than the upper piston ring groove of an internal combustion engine, a piston ring assembly comprising a split expansible upper ring member, a thin split expansible lower ring member, and an expander acting on the lower ring member throughout the normal life thereof, said lower ring member having a peripheral and a side coating of non-corrodible lubricating metal whereby to deposit a coating of such metal on the cylinder wall from the peripheral surface during the initial stages of operation of the ring assembly, the side coating of the lower member being of the order of .0003 or over thereby providing a source of supply of non-corrodible lubricating metal which is deposited on the cylinder wall as the cylinder contacting surface of the lower ring member is worn away following the wearing away of the coating on the cylinder contacting surface of the ring member during its initial operation, the upper member being without such coating metal.

3. A piston ring assembly adapted for use in a piston ring groove other than the upper piston ring groove of an internal combustion engine piston, of a piston ring assembly comprising a split expansible upper ring member, a thin split expansible lower ring member of wear-resisting material and of substantially greater radial width than the upper ring member, an expander acting on the lower ring member throughout the normal life thereof, said lower ring member having a coating of non-corrodible lubricating metal on its external periphery and on both of its sides whereby to deposit a film of such metal on the cylinder wall from the peripheral surface during the initial stages of operation of the ring assembly, the side coating of the member being of such thickness as to continue to deposit non-corrodible lubricating metal on the cylinder wall in substantial quantities as the cylinder contacting edge of the lower member is worn away in use, the upper member being without such metal coating.

4. The combination with a piston having a plurality of piston ring grooves in axially spaced relation therein, a piston ring assembly disposed in one of said grooves beneath the top groove and comprising a split expansible cast iron member, a lower thin split expansible member of ribbon steel having a radial width substantially exceeding that of the upper member, and an expander acting on said ring members, said lower member having a peripheral and side coating of non-corrodible lubricating metal, the side coating being such as to provide a supply of such metal which is gradually advanced to contact the cylinder wall as the lower ring member is worn following the wearing away of the coating on the outer peripheral surface thereof, the upper member being without such coating metal.

HAROLD P. PHILLIPS.